United States Patent
Brevart et al.

[11] Patent Number: 6,161,664
[45] Date of Patent: Dec. 19, 2000

[54] FIXING ARRANGEMENT WITH DAMPING FOR A DEVICE WHICH IS PROTECTED FROM VIBRATION

[75] Inventors: Bertrand Brevart, Toulouse; Philippe Charbonnier, St-Cheron; Vincent Barbet, Toulouse, all of France

[73] Assignee: Alcatel, Paris, France

[21] Appl. No.: 09/125,144

[22] PCT Filed: Dec. 12, 1997

[86] PCT No.: PCT/FR97/02293

§ 371 Date: Aug. 11, 1998

§ 102(e) Date: Aug. 11, 1998

[87] PCT Pub. No.: WO98/26198

PCT Pub. Date: Jun. 18, 1998

[30] Foreign Application Priority Data

Dec. 12, 1996 [FR] France .................................. 96 15268

[51] Int. Cl.[7] ........................................................ F16F 7/10
[52] U.S. Cl. .................................................. 188/379; 267/136
[58] Field of Search ............................ 188/379; 267/136, 267/140.14, 140.15; 248/550, 562, 566

[56] References Cited

U.S. PATENT DOCUMENTS 4,240,141  12/1980  Vasiliev et al. ............................. 73/664
5,333,455   8/1994  Yoshioka ..................................... 60/533
5,458,222  10/1995  Pla et al. ................................... 188/378

FOREIGN PATENT DOCUMENTS 0 545 264   6/1993  Japan ....................................... 188/378

*Primary Examiner*—Matthew C. Graham
*Assistant Examiner*—Devon Kramer
*Attorney, Agent, or Firm*—Sughrue, Mion, Zinn, Macpeak & Seas, PLLC

[57] ABSTRACT

A fixing arrangement with damping for fixing a device (1) to be protected from vibration, which device includes at least one mounting portion via which the device is fixed to a portion of a support (2) by fastening means (3, 4). The arrangement includes at least two piezoelectric elements (5, 6), each of which has its electrodes electrically shunted by an individual or shared impedance of determined structure. At least one of the elements (5) is used in bending and is interposed between a portion of the support and a mounting portion of the device to be protected. At least one of the elements (6) is used in compression and is interposed between one of the fastening means and either the support portion or the mounting portion.

6 Claims, 1 Drawing Sheet

FIXING ARRANGEMENT WITH DAMPING FOR A DEVICE WHICH IS PROTECTED FROM VIBRATION

The present invention relates to a fixing arrangement with damping for a device liable to be subjected to vibration from which it needs to be protected, in particular to prevent resonance phenomena from appearing, such resonance causing disturbance and possibly damage.

Such an arrangement is, for example, organized to fix a solar panel, a satellite antenna, or a reflector deployment arm to a support.

BACKGROUND OF THE INVENTION

There exist numerous fixing arrangements, in particular mechanical and electromechanical fixing arrangements, intended to prevent, or failing that, to damp either vibration of the devices that they fix together, or vibration that is produced at the device or at the supports therefor and that can be transmitted from the devices to the supports or vice versa.

Certain types of vibration can disturb and sometimes damage the devices and/or the supports that they affect, in particular when they give rise to resonance phenomena. Thus, for example, there is a major risk of a planar satellite antenna structure being destroyed by resonance on launching the spacecraft serving to put it into orbit, when a low-frequency vibration is transmitted to it via its support and/or acoustically.

To avoid such drawbacks, attempts are made firstly to apply treatment directly by damping at the device that needs to be protected against the vibration, and secondly to decouple the vibration source(s) from the device to be protected.

One conventional solution for providing such decoupling consists in interposing passive damping means, such as elastomer washers between a device and its support. Unfortunately, although that solution is very effective against high-frequency and medium-frequency vibration, it suffers from the drawback of tending to amplify the movements caused by vibration whose frequency is low. When the vibration is at frequencies distributed over a wide band, it is then necessary to associate the passive damping means with non-linear displacement-limiting means and/or active control means.

It is known that piezoelectric materials such as PZT or PVDF can be used in passive vibration-damping arrangements.

It is also known that a piezoelectric element having electrodes shunted by an inductive circuit behaves as if it were viscoelastic and it then has a damping factor that is similar to the damping factors of viscoelastic materials and that varies as a function of frequency and as a function of the electrical characteristics of the shunt circuit for a given element.

Document EP-A-0 375 370 describes a method of conditioning a piezoelectric element. That method makes it possible to cause the stiffness of the element to vary significantly by acting on a capacitor included in a resistive circuit via which electrodes provided in the element are shunted. It recommends implementing that method in damping arrangements. However, the damping factor that can be obtained for a piezoelectric element working in bending is considerably lower than the damping factor that can be obtained with elements made of viscoelastic materials.

That method does not make it possible to implement a fixing arrangement that offers both high rigidity and a good damping factor for fixing a device to a support when the device needs to be protected from vibration.

SUMMARY OF THE INVENTION

The present invention therefore proposes a fixing arrangement with damping for fixing a device that is to be protected from vibration, the fixing arrangement making it possible, in particular, to damp resonance that can occur at the device and in the low-frequency range.

The arrangement comprises at least one "mounting" portion via which the device is fixed to a support by fastening means, and at least one piezoelectric element which has electrodes shunted electrically by an impedance that is of a determined structure and that is in an interface position between the support and a mounting portion of determined dimensions.

According to a characteristic of the invention, the arrangement comprises at least two piezoelectric elements, each of which has its electrodes electrically shunted by an individual or shared impedance of a determined structure, with at least one of the elements being used in bending and being interposed between a portion of the support and a mounting portion of the device to be protected, and at least one element being used in compression and being interposed between one of the fastening means and either the support portion or the mounting portion.

According to a characteristic of the invention, the arrangement includes a piezoelectric element used in bending and implemented in the form of a plate that is dimensioned and positioned so as to extend beyond at least one of the portions against which it is secured, namely either the mounting portion or the support portion.

According to a characteristic of the invention, the arrangement comprises at least one piezoelectric element used in compression and implemented in the form of a washer positioned between either a support portion or a mounting portion and fastening means for fastening the mounting portion to the support portion, the washer being mounted around a stem serving as a clamping intermediary included either in the fastening means, or in additional fastening means.

According to a characteristic of a variant of the invention, the arrangement comprises a plurality of piezoelectric elements used in bending and forming a stack of plates, a first one of the plates being secured against a mounting portion or a support portion, the stack being dimensioned and positioned so as to extend beyond the mounting portion or the support portion against which the first plate of the stack is secured.

According to a characteristic of a variant of the invention, the arrangement comprises at least one piezoelectric element used in compression and implemented in the form of a stack of washers positioned between either a support portion or a mounting portion and fastening means for fastening the mounting portion to the support portion, the stack being mounted around a stem serving as a clamping intermediary included either in the fastening means or in additional fastening means.

According to a characteristic of the invention, the arrangement includes fastening means of the nut-and-bolt type having at least one bolt stem which passes both through a piezoelectric element of the washer or stack of washers type, and through a piezoelectric element of the plate type, provided with a through opening for receiving each bolt.

The invention, its characteristics, and its advantages are described in more detail in the following description given with reference to the figures listed below:

DETAILED DESCRIPTION OF THE PREFERRED EMBODIMENTS

Figure 1:
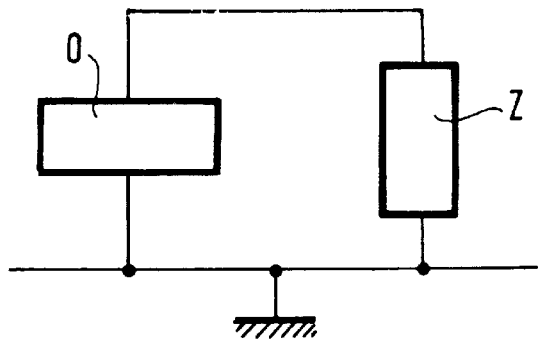
FIG. 1 is diagram of a circuit using a known principle for electrically connecting a piezoelectric element for a damping arrangement.

The arrangement of the invention is assumed to include a conventional electric circuit, comprising a set of one or more piezoelectric elements, and referenced 0 in FIG. 1. A passive or preferably an active impedance, referenced Z, is connected across the terminals of the circuit. One of the terminals that is common to the set of piezoelectric elements and to the impedance is connected to a ground potential, as is known. An electric circuit of this type is assumed to be provided in each of the arrangements of the invention, and it is not shown in accompanying FIGS. 2 to 4 insofar as it is only indirectly related to the invention.

Figure 2:
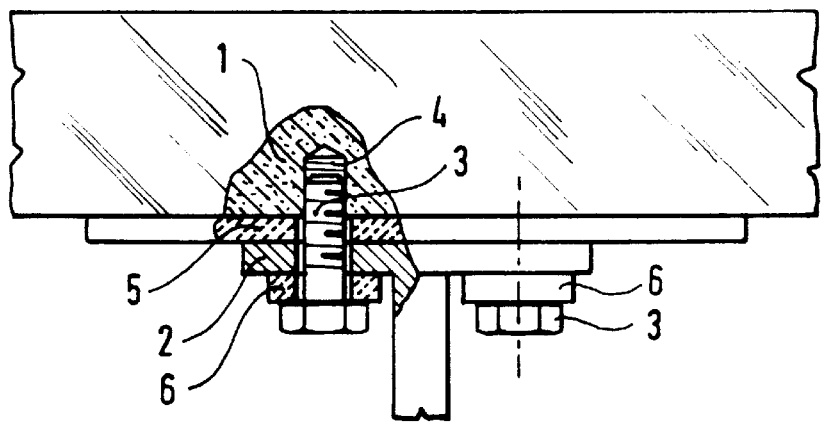
FIG. 2 shows a first embodiment of an arrangement of the invention.

The arrangement of the invention shown in FIG. 2 is designed to fix a device 1 to a support 2, the device being liable to be subjected to vibration from which it needs to be protected.

For example, the device may be constituted by satellite antenna panel, or by a solar panel. It includes at least one "mounting" portion which is the only portion shown in the figures, and via which it is fixed to a portion of the support 2, shown in the form of a stand-type element. The device is fixed to the support via a fixing arrangement with damping that is optionally constituted in modular manner if the device includes a plurality of mounting portions, each of which corresponds to a respective portion of the support.

In the examples shown, a single mounting portion is shown for the device 1 in question, and as is known, provision is made to use piezoelectric elements in combination with fastening means for implementing the vibration-damping fixing arrangement of the invention.

Fastening the mounting portion of the device 1 to a portion of the support 1 is shown by way of example as being achieved by first fastening means, such as a bolt 3, co-operating with second means complementary to the first means, such as complementary tapping 4, assumed in this example to be provided in the mounting portion of the device 1.

Figure 3:
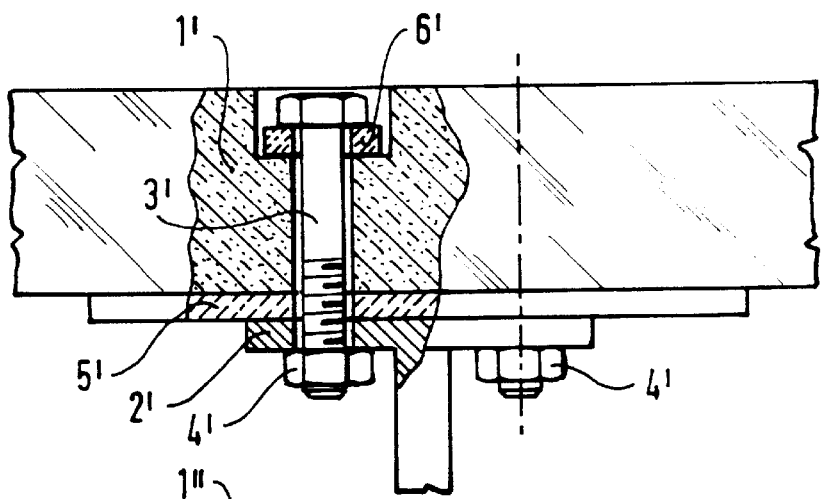
FIG. 3 shows a second embodiment of an arrangement of the invention.
Figure 4:
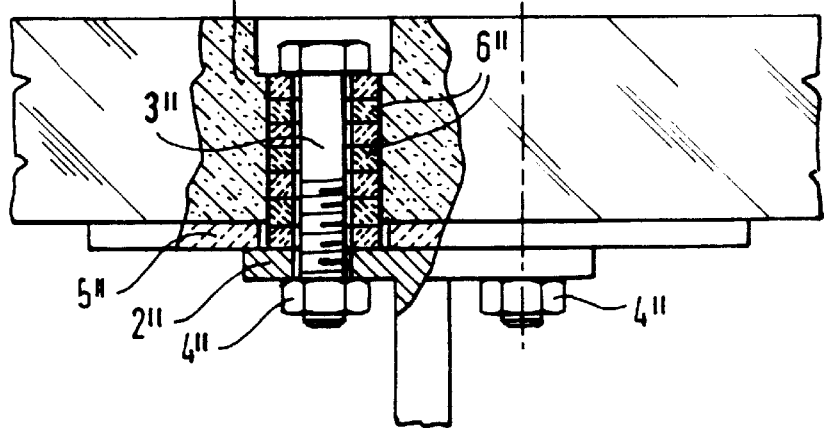
FIG. 4 shows a third embodiment of an arrangement of the invention.

Naturally, other fastening means may be implemented to procure equivalent effects, as shown in particular in FIGS. 3 and 4 in which a nut 4' is implemented in co-operation with a bolt 3' to obtain the clamping effect that can also be obtained by the fastening means constituted by the tapping 4 and the bolt 3.

In accordance with the invention, and as shown in particular in FIG. 2, a piezoelectric element 5, assumed in this example to be implemented in the form of a plate designed to work in bending, is interposed between the mounting portion of the device 1 in question and that portion of the support 2 to which the mounting portion is fixed. An insulating separator (not shown) is provided between the plate which constitutes the element 5 and one of the two portions between which it is interposed and against which it bears via its two large faces. The element 5 is assumed in this example to be grounded by being in contact with that one of the two portions against which it bears directly, without the insulating separator being interposed, if, as assumed in this example, the device 1 and the support 2 are themselves grounded at least at the two portions that are assumed to be conductive and that are considered above.

For example, the plate which constitutes the piezoelectric element 5 may be made of one or more layers of a material such as PZT or PVDF, as indicated above, and it is designed to damp any bending of the device where the mounting portion of the device is fastened to the corresponding portion of the support.

In one embodiment, the plate which constitutes the piezoelectric element 5 extends beyond at least one of the two portions, namely the mounting portion of the device 1 and the portion of the support 2, between which portions the plate is interposed.

In the embodiment shown in FIG. 2, in which that portion of the support to which the device is fixed is assumed to be of the stand type including an enlarged seat, the plate extends beyond said seat. In many cases, the device 1 can have dimensions considerably larger than the dimensions of the seat of the support 2 to which it is fixed.

In a variant of the invention (not shown), provision is made to replace the single piezoelectric element 5 shown in FIG. 2 with a stack of piezoelectric elements used in bending, thereby enabling the voltage applied to each element to be divided in proportion to the number of elements in the stack compared with the case when a single element is implemented.

In accordance with the invention, and as shown in particular in FIG. 2, provision is made to associate at least one other piezoelectric element 6, assumed in this example to be implemented in the form of at least one washer designed to work in compression, it being understood that the term "washer" covers any part performing an equivalent function. Each washer corresponds to a different piezoelectric element 6 and is assumed in this example to be interposed between that portion of the support 1 against which the piezoelectric element 5 as considered above bears, and one of the fastening means, i.e. in this example the bolt 3, or more precisely the head of this bolt 3 which fixes the device 1 to the support 2. Once the device is fastened to the support by bolting, such a washer as threaded over the stem of the corresponding bolt 3 is held between the head of the bolt and the portion of the support 2 through which said bolt passes to screw into the tapping 4 provided for it in the mounting portion of the device 1.

Naturally, in numerous embodiments (not shown), a plurality of piezoelectric elements 6 may be associated with the same piezoelectric element 5 at a fixing module for fixing one or more mounting portions of a device to one or more corresponding portions of a support. Such a configuration being symbolized by the presence of an axis disposed symmetrically relative to the bolt 4 about the axis of the support stand 2, 2', 2" in FIGS. 2 to 4.

In the embodiments considered, each bolt passes through the plate constituting the piezoelectric element 5 so as to screw into the tapping 4 in the mounting portion of the device 1.

In a variant embodiment shown in FIG. 3, the arrangement includes a piezoelectric element 5' corresponding to the piezoelectric element 5 shown in FIG. 2, but each piezoelectric element 6' which corresponds to an element 6 of FIG. 2 is, in this example, clamped against the head of a bolt 3' which is accessible from the other side of the mounting portion of the device 1' relative to the piezoelectric element 5' and relative to the support 2'. Each bolt 3' presses a piezoelectric element 6' through which it passes against the mounting portion of the device, through which portion its stem also passes. The stem also passes through the support portion 2' to which said mounting portion is fixed so as to make it possible to screw on a clamping nut 4' that performs a function analogous to the function of the tapping 4.

In another variant embodiment shown in FIG. 4, the arrangement includes a piezoelectric element 5" corresponding to the piezoelectric element 5 shown in FIG. 2, but each piezoelectric element 6" which corresponds to an element 6 of FIG. 2 is, in this example, constituted by a stack of washers through which a bolt stem 3" passes. Each bolt 3" is assumed in this example to be associated with a nut 4" in a mounting configuration corresponding to the configuration provided for a screw 3' and a nut 4' in the variant shown in FIG. 3. The stack which constitutes the piezoelectric element 6" then passes through the piezoelectric element 5" at an opening provided for the bolt 3", and it then comes directly into abutment against that portion of the support 1 to which the mounting portion of the device 1 is fixed, when the nut 4" is screwed to the bolt 3" so as to fasten the device to the support in the region of the nut and bolt.

In a variant embodiment, a calibrated spring (not shown) may optionally be placed between the head of the bolt 3 and the closer end washer in the stack so as to facilitate pressure adjustment. The washers constituting the piezoelectric elements 5, 5' and the stack constituting the piezoelectric element 5" make it possible to damp the bending of the device 1 by being compressed in the direction of their respective thicknesses, which direction is perpendicular to the electrodes provided at the ends of these elements.

The elements thus present a high damping potential because the corresponding mechanical-to-electrical conversion coefficient "$k_{33}$" is higher than 0.7, and is therefore high. The plate constituting the piezoelectric element 6, 6', or 6" has a coefficient "$k_{31}$" that is less than 0.4 and is therefore significantly lower, this being compensated by the large area of the plate.

Each of the above-mentioned piezoelectric elements is connected to ground potential by one electrode, and is insulated from said potential by means of the insulating separator at another electrode, as indicated above. As known to the person skilled in the art, the other electrode(s) is/are connected to one or more active or passive impedances of a given structure, making it possible to shunt the elements either individually or in parallel depending on the choices made.

Shunting by a resistor alone makes it possible to obtain a small amount of damping over a broad band. The lower the capacitance of the piezoelectric element, the greater the damping.

Implementing an impedance made up of a resistor and of a passive or an active inductor, and made, for example by associating high-voltage amplifiers, makes it possible to control resonance.

It is also possible to use a multimode resonant electric circuit optionally associated with a circuit, making it possible to vary the capacitance of a piezoelectric element across the terminals of which the multimode resonant circuit is placed.

Any variations in the dynamic range of the device 1 to be protected, and in particular resonance, can be taken into account by adjusting the resistors and the inductors which are adjusted by means of resistors which are themselves adjustable. The initial adjustment is preferably modified in real time as a function of the variations in the vibration frequencies over time, which frequencies are determined by appropriate signal-processing means which are not described in any more detail herein insofar as they are related only indirectly to the present invention.

What is claimed is:

1. A fixing arrangement with damping for fixing a device to be protected from vibration, the device which includes at least one "mounting" portion via which the device is fixed to a portion of a support by a nut-and-bolt fastening mechanism, said arrangement comprising:

a plurality of piezoelectric elements, each of which has its electrodes electrically shunted by either one of an individual and a shared impedance of determined structure, with at least one of the piezoelectric elements being used in bending and being interposed at a nut end of said nut-and-bolt fastening mechanism directly between a portion of the support and a mounting portion of determined dimensions, of the device to be protected, and at least another one of the piezoelectric elements being used in compression and being interposed between a bolt end of said nut-and-bolt fastening mechanism and the support portion.

2. A fixing arrangement according to claim 1, wherein said one of the piezoelectric elements used in bending is implemented in a form of a plate that is dimensioned and positioned so as to extend beyond at least the portion against which it is secured, namely either one of the mounting portion and the support portion.

3. A fixing arrangement according to claim 1, wherein at least one of said piezoelectric elements used in compression is implemented in a form of a washer positioned between either one of a support portion and a mounting portion and said nut-and-bolt fastening mechanism for fastening the mounting portion to the support portion, said washer being mounted around a stem serving as a clamping intermediary included in either one of the fastening mechanism and in additional fastening mechanisms.

4. A fixing arrangement according to claim 1, wherein the nut-and-bolt mechanism includes at least one bolt stem which passes both through a piezoelectric element of either one of a washer type and stack of washers type, and through a piezoelectric element of a plate type, provided with a through opening for receiving each said bolt, and a nut which is screwed onto said bolt to fix said device.

5. A fixing arrangement with damping for fixing a device to be protected from vibration, the device which includes at least one "mounting" portion via which the device is fixed to a portion of a support by fastening means, said arrangement comprising:

a plurality of piezoelectric elements, each of which has its electrodes electrically shunted by either one of an individual and a shared impedance of determined structure, with at least one of the piezoelectric elements being used in bending and being interposed between a portion of the support and a mounting portion of determined dimensions, of the device to be protected, and at least another one of the piezoelectric elements being used in compression and being interposed between one of the fastening means and either one of the support portion and the mounting portion;

wherein said plurality of piezoelectric elements used in bending forms a stack of plates, a first one of the plates being secured against either one of a mounting portion and a support portion, said stack being dimensioned and positioned so as to extend beyond one of the mounting portion and the support portion against which the first plate of the stack is secured.

6. A fixing arrangement with damping for fixing a device to be protected from vibration, the device which includes at least one "mounting" portion via which the device is fixed to a portion of a support by fastening means, said arrangement comprising:

a plurality of piezoelectric elements, each of which has its electrodes electrically shunted by either one of an individual and a shared impedance of determined structure, with at least one of the piezoelectric elements being used in bending and being interposed between a portion of the support and a mounting portion of determined dimensions, of the device to be protected, and at least another one of the piezoelectric elements being used in compression and being interposed between one of the fastening means and either one of the support portion and the mounting portion;

wherein at least one of said piezoelectric elements used in compression is implemented in the form of a stack of washers positioned between either one of a support portion and a mounting portion and the fastening means for fastening the mounting portion to the support portion, said stack being mounted around a stem serving as a clamping intermediary included in either one of the fastening means and in additional fastening means.

* * * * *